United States Patent
Tsai et al.

(10) Patent No.: US 10,824,277 B2
(45) Date of Patent: Nov. 3, 2020

(54) ELECTRICAL DEVICE WITH PIEZOELECTRIC ELEMENTS COMMUNICATING HAPTICALLY AND AUDIBLY WITH USER

(71) Applicant: Chiun Mai Communication Systems, Inc., New Taipei (TW)

(72) Inventors: Sheng-Hsiung Tsai, New Taipei (TW); Ching-Ming Hung, New Taipei (TW)

(73) Assignee: Chiun Mai Communcation Systems, Inc., New Taipei (TW)

( * ) Notice: Subject to any disclaimer, the term of this patent is extended or adjusted under 35 U.S.C. 154(b) by 0 days.

(21) Appl. No.: 16/286,635

(22) Filed: Feb. 27, 2019

(65) Prior Publication Data
US 2019/0278428 A1 Sep. 12, 2019

(30) Foreign Application Priority Data
Feb. 27, 2018 (CN) .......................... 2018 1 0161203

(51) Int. Cl.
| | |
|---|---|
| *G06F 3/043* | (2006.01) |
| *G06F 3/01* | (2006.01) |
| *G10L 21/0208* | (2013.01) |
| *H04R 5/033* | (2006.01) |
| *H04R 5/04* | (2006.01) |

(52) U.S. Cl.
CPC ............ *G06F 3/0433* (2013.01); *G06F 3/016* (2013.01); *G10L 21/0208* (2013.01); *H04R 5/033* (2013.01); *H04R 5/04* (2013.01); *G10L 2021/02082* (2013.01)

(58) Field of Classification Search
None
See application file for complete search history.

(56) References Cited

U.S. PATENT DOCUMENTS

| | | | |
|---|---|---|---|
| 2005/0054390 A1* | 3/2005 | Tuovinen | B06B 1/0215 455/575.1 |
| 2015/0055789 A1* | 2/2015 | Bernal Castillo | G10K 11/178 381/71.6 |
| 2019/0064997 A1* | 2/2019 | Wang | G06F 3/016 |
| 2019/0182590 A1* | 6/2019 | Harris | H04R 3/04 |

FOREIGN PATENT DOCUMENTS

| | | |
|---|---|---|
| CN | 102947878 A | 2/2013 |
| TW | 1580228 B | 4/2017 |

\* cited by examiner

*Primary Examiner* — Benjamin C Lee
*Assistant Examiner* — Krishna P Neupane
(74) *Attorney, Agent, or Firm* — ScienBiziP, P.C.

(57) ABSTRACT

An electrical device providing audible and haptic communication with its user includes a touch screen, an array of piezoelectric elements, a memory, and a processor. The touch screen is divided into touch regions and each touch region carries one piezoelectric element. When receiving touch inputs from a user, the processor uses data and programs stored in the memory to (1) determine which touch region the touch input is located in, (2) determine which piezoelectric element corresponds to the determined touch region, and (3) vibrate the determined piezoelectric element at a predetermined frequency. The electrical device can output sound by (1) obtaining a signal of the sound to be output and (2) vibrating the piezoelectric element, or more than one at different predetermined frequencies, to output an audible sound.

9 Claims, 4 Drawing Sheets

ELECTRICAL DEVICE WITH PIEZOELECTRIC ELEMENTS COMMUNICATING HAPTICALLY AND AUDIBLY WITH USER

FIELD

The present disclosure relates to human-computer interfacing.

BACKGROUND

An electrical device such as a mobile phone provides tactile feedback through a vibrator mounted in a predetermined position thereof. However, no matter where a user touches a touch screen of the electrical device, the motor is always in the same position and not aligned with the user's touch position. Therefore, the user experience is not optimal. An electrical device can also produce sound through a loudspeaker and an earpiece. The electrical device must include speaker holes and earpiece holes in a housing thereof. Waterproofing becomes a problem because of such holes in the electrical device. In addition, the vibrator, the loudspeaker, and the earpiece occupy space inside the electrical device, so are inconsistent with the trend of thinning the electrical device.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
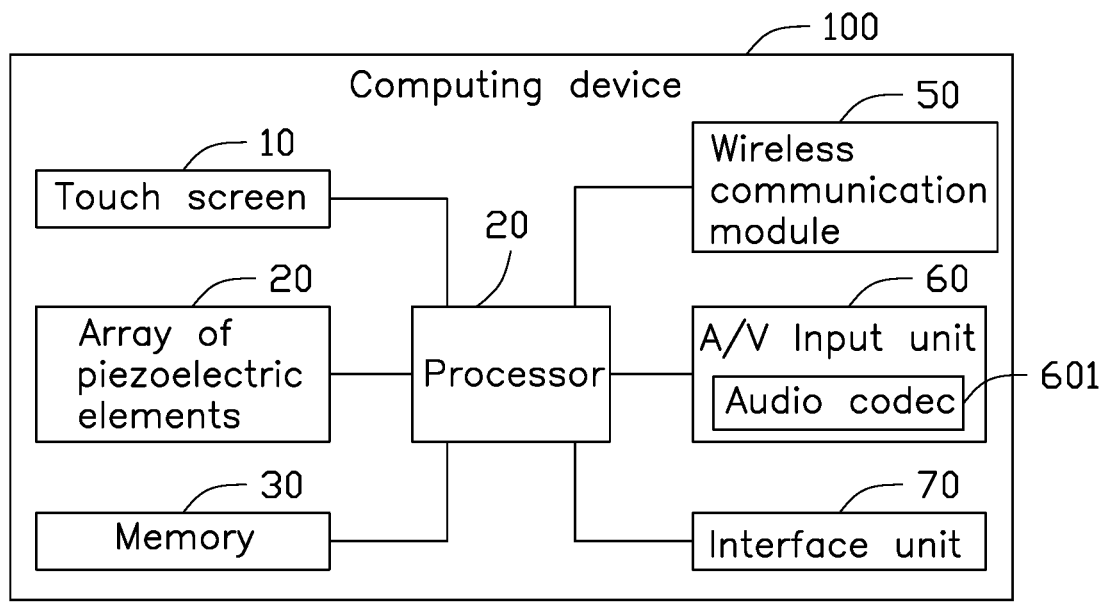
FIG. 1 is a block diagram of an embodiment of an electrical device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

With reference to FIG. 1, an electrical device 100 includes a touch screen 10, an array of piezoelectric elements 20, a memory 30, a processor 40, a wireless communication module 50, an audio/video (A/V) input unit 60, and an interface unit 70. The electrical device 100 may include more or less components than as described.

The touch screen 10 is configured to receive touch inputs from a user, and display information such as text, graphics, videos, or the like. The touch screen 10 may be a resistive touch screen, a capacitive touch screen, an infrared touch screen, or a surface acoustic wave touch screen. Each piezoelectric element 201 may include a piezoelectric ceramic sheet and a metal substrate.

Figure 2:
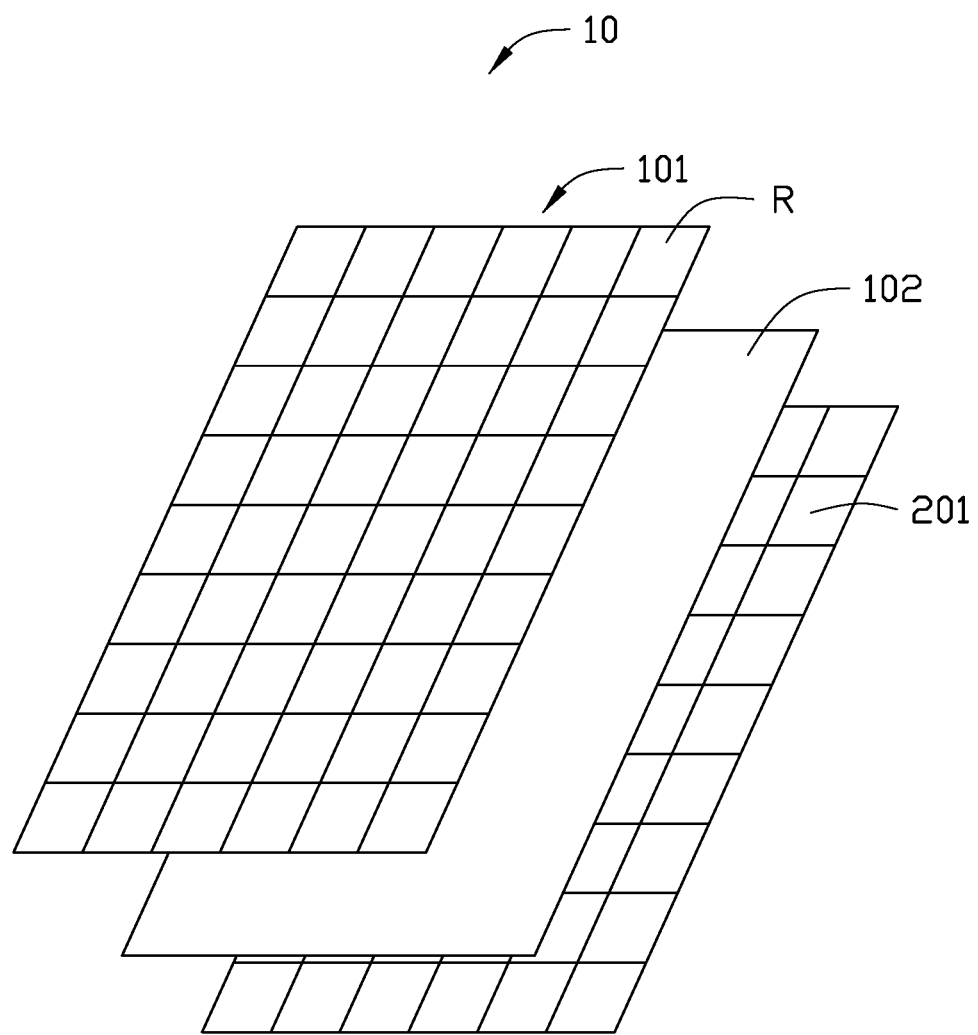
FIG. 2 is a schematic exploded view of a touch screen and an array of piezoelectric elements of the electrical device of FIG. 1.

With further reference to FIG. 2, the touch screen 10 is divided into a plurality of touch regions R. The touch screen 10 includes a touch panel 101 and a display panel 102. The touch panel 101 receives the user's touches. The piezoelectric elements 201 are disposed under the touch screen 10. The piezoelectric elements 201 have a one-to-one correspondence with the touch regions R of the touch screen 10.

The memory 30 stores instructions executed by the processor 40. The memory 30 may further store other data associated with the electrical device 100, such as a phone book, audio/video data, image data, and the like. The memory 30 may be a read-only memory (ROM), a random access memory (RAM), a programmable read-only memory (PROM), an erasable programmable read-only memory (EPROM), an electrically erasable programmable read-only memory (EEPROM), a one-time programmable read-only memory (OTPROM), an optical storage device such as a compact disc read-only memory (CD-ROM), a magnetic storage device such as a magnetic disk or a magnetic tape, or any other computer readable storage media.

The processor 40 is coupled to the touch screen 10, the piezoelectric elements 201, and the memory 30. The processor 40 may include a single packaged integrated circuit, or may include a plurality of packaged integrated circuits having the same function or different functions. For example, the processor 40 may include one or more central processing units (CPUs), microprocessors, digital signal processors (DSPs), graphic processing units (GPUs), or a combination thereof. The processor 40 may further include a touch integrated circuit, a piezoelectric integrated circuit, and the like.

When the touch screen 10 receives a touch from the user, the processor 40 executes the instructions in the memory 30 to perform operations. The operations include: (1) determining which particular touch region R the touch input is located in; (2) determining which piezoelectric elements 201 correspond to the determined touch region R; and (3) vibrating the determined piezoelectric elements 201 at a predetermined frequency. The vibration of the piezoelectric element 201 is transmitted through a medium such as the touch screen 10 and a housing (not shown) of the electrical device 100. Therefore, tactile feedback at the user's touch position is provided, and the user experience is enhanced.

When the electrical device 100 needs to output sound, the processor 40 executes the instructions in the memory 30 to perform operations. The operations include: (1) obtaining a signal of the sound to be output; and (2) vibrating the piezoelectric elements 201 to output the sound according to the obtained signal. Sound output is also provided by the element 201. The sound to be output may be the speech of a telephone caller, the sound of music or of a movie stored in the memory 30 or acquired by the wireless communication module 50, or the like.

The wireless communication module 50 is coupled to the processor 40. The wireless communication module 50 is configured to establish a wireless connection between the electrical device 100 and other electrical devices such that the electrical device 100 can send data to and receive data from the other electrical devices. The wireless communication module 50 may include a broadcast receiving module, a mobile communication module, a local area network (LAN) module, a wireless network module, and the like. The broadcast receiving module may receive a signal broadcast from a broadcasting station. The mobile communication module is configured to communicate with a base station, with a server, and with other terminals in a mobile communication network. The communication may be in the form of voice call data, video call data, or the like. The LAN module may include BLUETOOTH, ZIGBEE, and the like. The wireless network module may include WI-FI, WIMAX, and the like.

The A/V input unit 60 is coupled to the processor 40. The A/V input unit 60 is configured to receive audio and video signals from an external source. The A/V input unit 60 may include a microphone and a camera. The microphone can receive sound. During a video function, the camera captures images and the wireless communication module 50 transmits the captured images to an external device. The A/V input unit 60 may further include an audio codec 601. When the microphone receives sound, the audio codec 601 can remove noise in the sound and also remove echo or feedback generated by the piezoelectric elements 201.

The interface unit 70 is coupled to the processor 40. The interface unit 70 is configured to connect the electrical device 100 to other devices such as a headset and a charger. The interface unit 70 may include a headset jack, a universal serial bus (USB) port, and the like.

Figure 3:
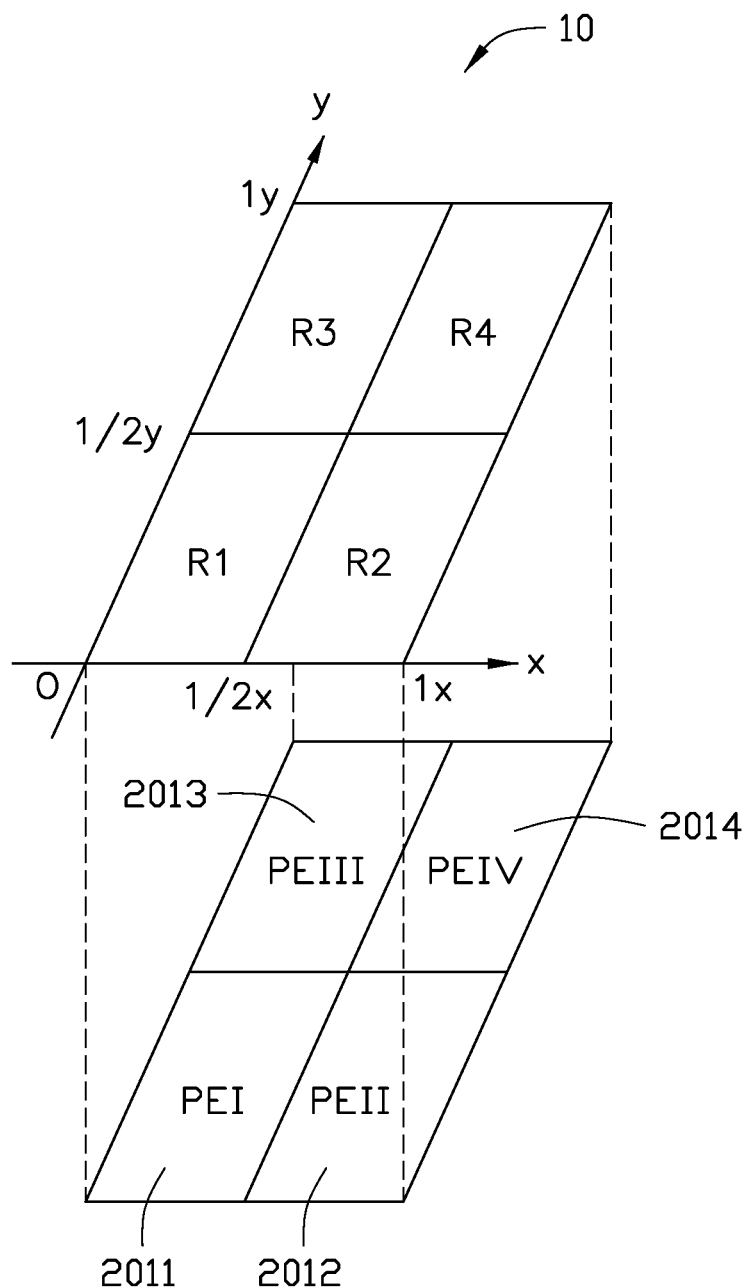
FIG. 3 is a schematic exploded view of a touch panel of the touch screen and the array of piezoelectric elements of the electrical device of FIG. 1.

With reference to FIG. 3, in the present embodiment, a touch panel 101 or part of such panel is divided into four rectangular touch regions, each labelled "R". There is a first touch region R1, a second touch region R2, a third touch region R3, and a fourth touch region R4. The first to fourth touch regions R1-R4 are arranged in a two-by-two matrix. The touch panel 101 is defined in an x-y coordinate system. The touch panel 101 has an x coordinate within the range of 0 to 1x, and a y coordinate within the range of 0 to 1y. The first touch region R1 has an x coordinate within the range of 0 to ½x, and a y coordinate within the range of 0 to ½y. The second touch region R2 has an x coordinate within the range of ½x to 1x, and a y coordinate within the range of 0 to ½y. The third touch region R3 has an x coordinate within the range of 0 to ½x, and a y coordinate within the range of ½y to 1y. The fourth touch region R4 has an x coordinate within the range of ½x to 1x, and a y coordinate within the range of ½y to 1y. An array of four rectangular piezoelectric elements 201 including a first piezoelectric element 2011, a second piezoelectric element 2012, a third piezoelectric element 2013, and a fourth piezoelectric element 2014 are positioned under the entire touch screen 10. The first piezoelectric element 2011 has identification PEI. The second piezoelectric element 2012 has identification PEII. The third piezoelectric element 2013 has identification PEIII. The fourth piezoelectric element 2014 has identification PEIV. The individual identifications PEI-PEIV may represent coordinate values, serial numbers of the piezoelectric elements 201, or predetermined numbers set by the user.

In other embodiments, the touch panel 101 may be divided into a plurality of touch regions R which are each for example hexagonal in shape.

In the present embodiment, the memory 30 stores correspondence between the first touch region R1 and identification PEI of the first piezoelectric element 2011, between the second touch region R2 and identification PEII of the second piezoelectric element 2012, between the third touch region R3 and identification PEIII of the third piezoelectric element 2013, and between the fourth touch region R4 and identification PEIV of the fourth piezoelectric element 2014.

Figure 4:
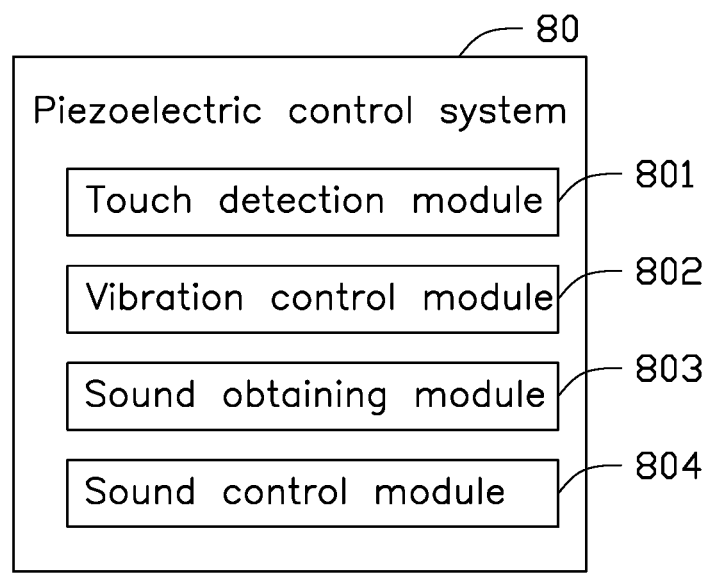
FIG. 4 is block diagram of a piezoelectric control system of the electrical device of FIG. 1.

With reference to FIG. 4, the electrical device 100 further includes a piezoelectric control system 80 coupled to the processor 40. The piezoelectric control system 80 may include a touch detection module 801, a vibration control module 802, a sound obtaining module 803, and a sound control module 804.

The touch detection module 801 is configured to obtain the touch input from the user's touch to determine a coordinate of the touch input, and then to determine the touch region R in which the touch input is located. For example, when the coordinate of the touch input is (¼x, ¼y), the touch detection module 801 will determine that the touch input is in the first touch region R1.

The vibration control module 802 is configured to determine which piezoelectric elements 201 correspond to the determined touch region R, and then vibrate the determined piezoelectric elements 201 at a predetermined frequency. The vibration control module 802 determines which piezoelectric elements 201 correspond to the determined touch region R according to the stored correspondence between the touch regions R and the piezoelectric elements 201. For example, when the touch input from the user's touch is in the first touch region R1, the vibration control module 802 determines that first piezoelectric element 2011 is the corresponding element, and then vibrates the first piezoelectric element 2011 in the frequency range of 0-250 Hz.

The sound obtaining module 803 is configured to obtain the signal of the sound that needs to be output from the electrical device 100.

The sound control module 804 is configured to vibrate one or more of the piezoelectric elements 201 to output the sound that needs to be output. Each piezoelectric element 201 can be configured to output a portion of the sound to be output.

The sound control module 804 can vibrate each piezoelectric element 201 to output the sound present in one channel of multiple channels. For example, when the sound to be output has a left channel signal and a right channel signal, the sound control module 804 vibrates a number of the piezoelectric elements 201 in response to the left channel signal to output sound, and vibrates other piezoelectric elements 201 in response to the right channel signal to output the sound.

The sound control module 804 can vibrate each piezoelectric element 201 to output the sound of one frequency range. For example, when the sound to be output exists in a low frequency range (30-150 Hz), a medium-low frequency range (150-500 Hz), a medium-high frequency range (0.5-5 KHz), and a high frequency range (5-20 KHz), the sound control module 804 can vibrate four of the piezoelectric elements 201 to output the overall sound.

In the present embodiment, a volume of the sound to be output can be proportional to the number of piezoelectric elements 201 which are vibrated. That is, the greater the volume of the sound to be output, the greater the number of piezoelectric elements 201 which vibrate, and the smaller the volume of the sound to be output, the smaller the number of piezoelectric elements 201 which vibrate. The sound control module 804 is configured to obtain the sound volume level set by the user, and then determines the number of piezoelectric elements 201 to be vibrated. The memory 30 stores correspondence between the sound volume levels and the number of piezoelectric elements 201 to be vibrated.

When sound obtaining module 803 obtains the sound signal to be output, the sound control module 804 obtains the sound volume level set by the user, determines the number of piezoelectric elements 201 to be vibrated, and then vibrates the piezoelectric elements 201. For example, the sound control module 804 vibrates five piezoelectric elements 201 to output the sound when determining that the overall volume required is equal to five piezoelectric elements 201.

The sound control module 804 may select the piezoelectric elements 201 randomly or according to a type of the sound to be output or according to a predetermined rule. The predetermined rule may be set by the user. For example, when the sound to be output is sound of a telephone caller's voice, the sound control module 804 vibrates the piezoelectric elements 201 located in the upper part of the electrical device 100 to output the sound. In this way, it is the piezoelectric elements 201 closest to the user's ear which are vibrated when the user holds the electrical device 100 during the telephone call, thereby simulating an earpiece function. As another example, when the sound to be output is music, the sound control module 804 vibrates the piezoelectric elements 201 located in the middle part of the electrical device 100 to output the sound, thereby simulating the function of a loudspeaker.

The piezoelectric elements 201 are vibrated to provide tactile feedback and sound. This arrangement replaces the vibrator, the loudspeaker, and the earpiece in conventional electrical devices. The electrical device 100 is also free of speaker holes and earpiece holes in the housing thereof, thereby improving the aesthetic appearance and waterproof characteristics of the electrical device 100.

The sound control module 804 can be further configured to determine whether a headset plug is inserted into the interface unit 70. A headset plug may be inserted by a user for private or silent listening. When a headset plug is inserted into the interface unit 70, the sound control module 804 transmits the signal of the sound to be output to the interface unit 70 such that the headset outputs the sound.

The embodiments shown and described above are only examples. Many details are often found in the art such as the other features of an electrical device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An electrical device comprising:
a touch screen configured to receive touch inputs, and the touch screen divided into a plurality of touch regions;
an array of piezoelectric elements disposed under the touch screen, and the piezoelectric elements having a one-to-one correspondence with the touch regions of the touch screen;
a memory storing instructions; and
a processor executing the instructions in the memory, and the processor coupled to the touch screen, the piezoelectric elements, and the memory;
wherein when the touch screen receives a touch input, the processor executes the instructions in the memory to perform operations comprising:
determining which touch region the touch input is located in;
determining which piezoelectric elements correspond to the determined touch region; and
vibrating the determined piezoelectric elements at a predetermined frequency; and
wherein when the electrical device needs to output sound, the processor executes the instructions in the memory to perform operations comprising:
obtaining a signal of the sound to be output; and
vibrating the piezoelectric elements to output the obtained signal of sound; and
wherein a volume of the sound to be output is proportional to the number of piezoelectric elements which are vibrated; and
wherein when the electrical device needs to output the sound, the processor executes the instructions in the memory, before vibrating the piezoelectric elements to output the sound, to perform operations comprising:
obtaining a set sound volume level; and
determining the number of piezoelectric elements to be vibrated.

2. The electrical device of claim 1,
wherein the touch screen is defined in an x-y coordinate system, and each touch region of the touch screen corresponds to a coordinate range of the x-y coordinate system;
wherein each piezoelectric element has a correspondence identification; and
wherein the memory stores correspondence between the touch regions and the correspondence identification of the piezoelectric elements.

3. The electrical device of claim 1, wherein each piezoelectric element outputs the sound present in one channel.

4. The electrical device of claim 3, wherein each piezoelectric element produces the sound in one frequency range.

5. The electrical device of claim 1, wherein each piezoelectric element outputs the sound in one frequency range.

6. The electrical device of claim 1, wherein when the electrical device needs to output the sound, the processor executes the instructions in the memory, after determining the number of piezoelectric elements to be vibrated, to perform operations comprising:
selecting the piezoelectric elements randomly; and
vibrating the selected piezoelectric elements to output the sound.

7. The electrical device of claim 1, wherein when the electrical device needs to output the sound, the processor executes the instructions in the memory, after determining the number of piezoelectric elements to be vibrated, to perform operations comprising:
selecting the piezoelectric elements according to a type of the sound to be output; and
vibrating the selected piezoelectric elements to output the sound.

8. The electrical device of claim 1, further comprising an interface unit; the interface unit coupled to the processor, and configured to connect the electrical device to a headset;
wherein when the electrical device needs to output the sound, the processor executes the instructions in the memory, after obtaining the signal of the sound to be output, to perform operations comprising:
determining whether a headset plug is inserted into the interface unit; and transmitting the signal of the sound to be output to the interface unit when the headset plug is inserted into the interface unit such that the headset outputs the sound.

9. The electrical device of claim 1, further comprising an audio input unit, the audio input unit coupled to the processor, and configured to receive audio signals, and the audio input unit comprising an audio codec;

wherein when the audio input unit receives sound, the audio codec removes noise in the sound and remove echo generated by the piezoelectric elements.

* * * * *